March 21, 1939.  W. NEWTON  2,151,225
LIVE BAIT CONTAINER
Filed Oct. 25, 1937
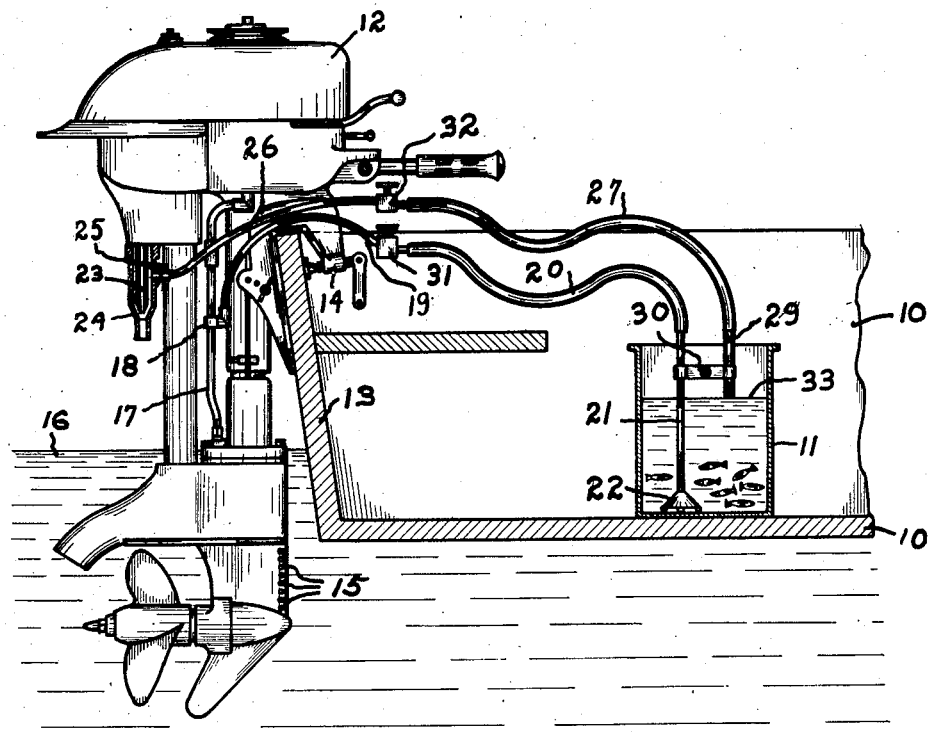
Inventor
W. Newton
By Arthur H. Sturges
Attorney Patented Mar. 21, 1939

2,151,225

UNITED STATES PATENT OFFICE 2,151,225

LIVE BAIT CONTAINER

William Newton, Omaha, Nebr.

Application October 25, 1937, Serial No. 170,903

5 Claims. (Cl. 43—4)

This invention relates to the piscatorial art and has for an object to provide means for transporting and maintaining fish bait in a healthy, vitalized and efficient condition for fishing purposes.

A further object of the invention is to provide means which is inexpensive in construction, may be readily assembled and operated and adapted to keep fish bait such as crawdads, frogs, minnows and the like alive during transportation to fishing grounds by supplying said bait with fresh water and an adequate amount of oxygen, while at the same time maintaining said bait in an accessible position within a boat for fishing purposes.

Other and further objects and advantages of the invention will be understood from the following detailed description thereof, reference being had to the accompanying drawing in which:

The single figure is a side elevation of an outboard motor combined in an operative position to a boat, the latter showing in fragmental section and depicting an embodiment of the invention.

As heretofore practiced in the art fishermen upon departing for a fishing ground in a boat have utilized a bucket or similar container having water and live fish bait therein, necessitating a stopping of the forward travel of the boat at intermittent intervals for the purpose of changing the water in the container whereby time is lost in reaching said fishing grounds; the bait often escaping from the container into the water, resultant from the necessity of dipping the bucket in said water and where frequent stops are not made for said purposes, especially during hot weather, the said bait frequently dies or arrives at the fishing ground in an inactive condition and inadequate for best fishing use.

During recent times fishing boats have been propelled extensively by outboard motors having a water pump or other suitable means for forcing water through the cylinders of the engine for cooling the latter and the present invention contemplates utilizing these adequate factors for maintaining fish bait in a desirable condition.

Referring now to the drawing for a more particular description 10 indicates a fishing boat adapted to transport occupants to a fishing ground, said boat being provided with a bait box or a like suitable container 11 positioned therein or carried thereby, said container having an open top whereby an operator may readily remove live bait therefrom. Preferably the container is removably arranged with respect to the boat and other parts of the apparatus.

An outboard motor or similar engine 12 is secured to the stern post 13 of the boat by any suitable means such as the employment of the clamp 14. The engine 12 may be of any suitable conventional type having means for forcing water through the engine adjacent the cylinders thereof for cooling said engine, the specific engine illustrated employing a plurality of apertures 15 which are normally submerged in the lake water whereby during the forward travel of the boat the water 16 of the lake or the like becomes forced through the apertures and upwardly through a conduit or pipeway 17 towards and through the water jackets of the engine, said water after performing its cooling function being discharged back into the lake from the motor. Other types of motors employ a pump or a scoop for forcing a circulation of water through the engine thereof during forward travel of the boat.

The specific type of motor depicted in the drawing is provided with a water intake pipe or passageway 17 which is in communication with the submerged apertures 15 and in the practice of the present invention said passageway or pipe 17 is tapped as at 18 and a by-pass conduit 19 provided, said conduit preferably including a portion formed of flexible material such as the rubber hose 20.

The hose 20 is provided with a pipe in communication therewith which extends to a point adjacent the bottom of the container 11 providing a water discharge port thereat and preferably the open end of said pipe 21 is provided with a flared or bell-shaped weighted hollow end 22 for spreading incoming water evenly over the bottom area of the container 11, said weight maintaining the pipe in a removable, vertical position in the container and at one side or end thereof, said weight insuring that the pipe 21 will not become accidently removed from the container incident to rough waves or the like and undue swaying motions applied to the boat.

The specific type of engine shown in the drawing includes a sleeve 24 which preferably encircles the water discharge outlet 23. A tap 25 is secured to said sleeve, said tap having a connection with a conduit or pipe 26, the latter preferably including a rubber hose section 27. The flexible hose 27 is provided with a pipe at its normally free end which, in use, extends into the container 11 providing a water intake within the container at the free end of said pipe 29, said intake being disposed adjacent the upper edge or open end of the container. The pipes 21 and 29 are secured together by means of a suitable clamp 30 in a manner whereby the pipe 29 may be adjusted longitudinally with respect to the clamp 30 for purposes later described, said clamp maintaining the pipes in the normal position shown in the drawing.

The pipes 19 and 26 are preferably provided with cut-off cocks 31 and 32 respectively.

In operation during forward travel of the boat a portion of the water which becomes forced or drawn upwardly of the conduit 17 becomes diverted through the pipe 19, cut-off cock 31, flexible hose 20 and pipe 21 into the container 11, the quantity of said diverted water being regulated by the valve or cut-off cock 31, if desired, whereby fresh water is supplied to the live bait within the container 11.

The outward movement of the water through the pipe 17, the water jackets of the engine or motor and the discharge outlet or orifice 23 creates a suction within the sleeve 24 which is applied through the conduit 26, cut-off valve 32, flexible hose 27 and the pipe 29 to the water within the container 11, thereby causing a circulation of fresh water through the container 11. The level 33 of the water within the container 11 may be selectively regulated by means of sliding the pipe 29 longitudinally with respect to the clamp 30 for disposing the intake end of the pipe 29 toward or away from the bottom of the container 11.

If desired and particularly at times when the device is to be used in water free from debris such as sea weeds and the like which might tend to obstruct the pipes 19 and 26, the cut-off cocks 31 and 32 may be omitted from the assembly and in lieu thereof the transverse area, diameter or capacity of the pipes 19 and 26 provided of such size that the latter is adequate for changing the water within the container 11 as heretofore described. Preferably the cut-off cocks 31 and 32 are employed in conjunction with comparatively larger pipes for governing the amount of water passed to and from the container 11, said cocks also being turned in an "off" position at times when the bait container 11 is not in use or at times when the pipes 21 and 29 are removed therefrom, for permitting passing the bait and container to fishermen forwardly of the boat 10. The pipe 29 and passageways or members 26 and 27 in communication therewith are preferably greater in capacity or of greater transverse area than the pipe 21 whereby water becomes removed from the container 11 faster than water is discharged into said container to prevent said water from overflowing the upper edge of the container and at times when both cut-off cocks 31 and 32 are in a fully "open" condition or are not employed in the assembly.

Obviously the suction pipe 26 in lieu of being attached to the sleeve 24 may be attached, if desired, to the intake pipe 17 and between the tap 18 thereof and the water jackets of the engine, whereby it will function as well as the above specifically described assembly. Preferably the pipe 26 is attached to said sleeve to prevent sediment and debris which may accidently enter the container 11 from becoming sucked into the water jackets of the engine.

From the foregoing description it is thought to be obvious that a live bait container constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as herein claimed.

I claim:

1. Means for supplying fresh water to live fish bait comprising a container, a pipe having an outlet disposed within and adjacent the bottom of said container, a second pipe having an intake disposed within and adjacent the top of said container, said pipes being adapted to be placed in communication with a source of circulating water supply for causing a passage of water through said pipes and container, and means for selectively maintaining said intake away from or toward said bottom for governing the quantity of water in said container.

2. In a live bait transporting and maintaining assembly, a boat, an outboard motor for propelling said boat through water, said motor having means for circulating said water through the motor for cooling the latter, a container for said bait carried by said boat, a pipe having an outlet disposed within and adjacent the bottom of said container, a second pipe having an intake disposed within and adjacent the top of said container, a flexible conduit connected to each said pipe and said motor water circulating means, whereby the motor is adapted to discharge water into said container through said outlet and to suck water from the container through said intake for causing a circulation of water through said container while permitting said container to be moved about said boat, valve means for regulating said circulation, and clamp means for selectively maintaining said intake away from or toward said bottom for governing the quantity of water in said container.

3. In a live bait maintaining assembly, a container, means for supplying water to the container, means for withdrawing water from the container, and means for selectively adjusting the withdrawing means to govern the quantity of water in the container.

4. In a live bait transporting and maintaining assembly, a container, means for supplying water to the container, means for withdrawing water from the container, and means for selectively maintaining said withdrawing means away from and toward the bottom of the container for governing the quantity of water in the container.

5. A live fish bait transporting and maintaining assembly of the character described, a boat, an outboard motor for propelling said boat, said motor being provided with a water circulator for taking water from the river or the like for cooling said motor, a bait container carried by said boat, flexible conduits in communication with said container and said circulator for causing a circulation of water through said container, valve means for regulating said circulation, and means for adjusting one of said conduits for governing the quantity of water in the container.

WILLIAM NEWTON.